United States Patent
Wong et al.

(10) Patent No.: US 10,181,357 B2
(45) Date of Patent: Jan. 15, 2019

(54) CODE GENERATING APPARATUS AND ONE TIME PROGRAMMING BLOCK

(71) Applicant: eMemory Technology Inc., Hsinchu (TW)

(72) Inventors: Wei-Zhe Wong, Hsinchu County (TW); Ching-Sung Yang, Hsinchu (TW); Ching-Hsiang Hsu, Hsinchu County (TW)

(73) Assignee: eMemory Technology Inc., Hsinchu (TW)

( * ) Notice: Subject to any disclaimer, the term of this patent is extended or adjusted under 35 U.S.C. 154(b) by 354 days.

(21) Appl. No.: 15/166,277

(22) Filed: May 27, 2016

(65) Prior Publication Data

US 2017/0053708 A1  Feb. 23, 2017

Related U.S. Application Data (60) Provisional application No. 62/206,828, filed on Aug. 18, 2015.

(51) Int. Cl.
*G11C 7/24* (2006.01)
*G06F 21/44* (2013.01)
(Continued)

(52) U.S. Cl.
CPC .............. *G11C 17/18* (2013.01); *G06F 21/44* (2013.01); *G11C 7/24* (2013.01); *G11C 17/16* (2013.01)

(58) Field of Classification Search
CPC  G11C 17/18; G11C 7/24; G11C 17/16; G06F 21/44
See application file for complete search history.

(56) References Cited

U.S. PATENT DOCUMENTS

| 8,300,450 B2 | 10/2012 | Christensen et al. |
| 2004/0047218 A1 | 3/2004 | Peng |
| 2006/0244099 A1 | 11/2006 | Kurjanowicz |
| 2007/0030719 A1 | 2/2007 | Hoefler et al. |
| 2007/0165441 A1 | 7/2007 | Kunanowicz et al. |

(Continued)

FOREIGN PATENT DOCUMENTS

| CN | 1681045 | 10/2005 |
| CN | 101128884 | 2/2008 |

(Continued)

OTHER PUBLICATIONS

"Office Action of Taiwan Counterpart Application," dated Jun. 13, 2017, p. 1-6.

(Continued)

*Primary Examiner* — Sharon S Lynch
(74) *Attorney, Agent, or Firm* — JCIPRNET (57) ABSTRACT

The invention provides a code generating apparatus and an OTP memory block. The code generating apparatus of present disclosure includes a plurality of first one time programming (OTP) memory cells, a reference signal provider and a sense amplifier. The first OTP memory cells are coupled to a first bit line. The reference signal provider provides a reference signal. Wherein, at least one of the first OTP memory cells provides a read current to the first bit line, and the sense amplifier compares the read current and the reference signal to generate an output code. A current value of the reference signal is set within a range, and the range is set by the bit current corresponding to a maximum bit count, such as that the output code is determined by a manufacturing variation of the at least one first OTP memory cell.

2 Claims, 5 Drawing Sheets

(51) Int. Cl.
*G11C 17/16* (2006.01)
*G11C 17/18* (2006.01)
*G11C 16/10* (2006.01)

(56) References Cited

U.S. PATENT DOCUMENTS

| | | |
|---|---|---|
| 2008/0189557 A1 | 8/2008 | Pipitone et al. |
| 2009/0109724 A1 | 4/2009 | Buer et al. |
| 2014/0126306 A1* | 5/2014 | Otterstedt ............... G11C 7/06 365/189.07 |
| 2015/0007337 A1 | 1/2015 | Krutzik |
| 2015/0055417 A1* | 2/2015 | Kim ....................... G11C 16/10 365/185.19 |
| 2015/0071432 A1* | 3/2015 | Zhu ..................... G11C 11/1673 380/28 |
| 2015/0098268 A1 | 4/2015 | Yabuuchi |
| 2015/0213890 A1 | 7/2015 | Katoh |

FOREIGN PATENT DOCUMENTS

| | | |
|---|---|---|
| CN | 102308338 | 1/2012 |
| JP | 2007536744 | 12/2007 |
| WO | 2014119327 | 8/2014 |
| WO | 2015105687 | 7/2015 |

OTHER PUBLICATIONS

"Office Action of Japan Counterpart Application," dated Jul. 4, 2017, p. 1-4.

"Search Report of European Related Application No. 161833891," dated Jan. 18, 2017, p. 1-7.

"Search Report of European Counterpart Application," dated Jan. 18, 2017, p. 1-9.

"Office Action of China Counterpart Application", dated Apr. 16, 2018, p. 1-9.

* cited by examiner

CODE GENERATING APPARATUS AND ONE TIME PROGRAMMING BLOCK

CROSS-REFERENCE TO RELATED APPLICATION

This application claims the priority benefits of U.S. provisional application Ser. No. 62/206,828, filed on Aug. 18, 2015. The entirety of the above-mentioned patent application is hereby incorporated by reference herein and made a part of this specification.

BACKGROUND

Field of the Invention

The invention relates to a code generating apparatus. Particularly, the invention relates to the code generating apparatus by using a plurality of one time programming (OTP) memory cells.

Description of Related Art

In recently, electronic apparatuses are important tools of people's life. For some purposes, an electronic apparatus needs to provide a specified code, such as an identification code. The identification code must be exactly identical whenever an identification creation is requested, and can be used for encoding and/or decoding operations, like PUF (physical unclonable function) in security disclosure. Sometimes, the electronic apparatus needs one or more random number code(s) for application. That is, how to provide the identification code and/or the random number code(s) by using an efficiency hardware is also an important course for a design in the art.

SUMMARY OF THE INVENTION

The invention is directed to a plurality of code generating apparatuses and generating method for providing output code according to a manufacturing variation of a plurality of OTP cells.

The invention is also directed to a one time programming (OTP) memory block for providing at least one of identity code and random number code.

The code generating apparatus of present disclosure includes a plurality of first one time programming (OTP) memory cells, a reference signal provider and a sense amplifier. The first OTP memory cells are coupled to a first bit line. The reference signal provider provides a reference signal. The sense amplifier is coupled to the first bit line and the reference signal provider. Wherein, at least one of the first OTP memory cells provides a read current to the first bit line, and the sense amplifier compares the read current and the reference signal to generate an output code, and a current value of the reference signal is set within a range, and the range is determined according to a relationship between a plurality of bit currents and a plurality of bit counts of the first OTP memory cells, and the range is set by the bit current corresponding to a maximum bit count, such as that the output code is determined by a manufacturing variation of the at least one first OTP memory cell.

Another code generating apparatus of present disclosure includes a plurality of OTP memory cell strings, a switch, and a sense amplifier. Each of the OTP memory cell strings includes a plurality of OTP memory cells, wherein the OTP memory cell strings are respectively coupled to a plurality of bit lines. The switch is coupled to the bit lines. The sense amplifier is coupled to the switch. Wherein, the switch selects two of the bit lines to respectively couple to a first input end and a second input end of the sense amplifier, and the sense amplifier senses a difference of signals on the two selected bit lines to generate an output code, and the output code is determined by manufacturing variation of the two selected OTP memory cells.

The present disclosure provides an OTP memory block, wherein the OTP block includes a plurality of code generating apparatuses, and a first part of the code generating apparatuses provide at least one identity code.

The present disclosure provides another OTP memory block, wherein the OTP block includes a plurality of code generating apparatuses, and a first part of the code generating apparatuses provide at least one random number code.

The present disclosure provides a method for generating an output code, and the output code is used for a physically unclonable function technology. He method includes: selecting at least one of a plurality of one time programming (OTP) memory cells and providing a read current according to the selected OTP memory cell; determining a relationship between a plurality of bit currents and a plurality of bit counts of the OTP memory cells; setting a range by the bit current corresponding to a maximum bit count; and, setting a reference signal at a predetermined current value which is in the range. Wherein, the output code is determined by a manufacturing variation of the selected OTP memory cell.

The present disclosure also provides a method for generating an output code, and the output code is security information. The method includes: providing a plurality of memory cells; programming the memory cells with a predetermined program bias voltage wherein the programming bias voltage is set to enlarge at least one manufacturing variation of the memory cells; and, generating a security code according to at least one of the memory cells.

According to the above descriptions, the output code can be determined by a manufacturing variation of each of the OTP memory cells, and the output code also can be adjusted by adjusting the reference signal. That is, the output code generated by the code generating apparatus can be treated as hardware intrinsic identity code for an OTP block of the code generating apparatus. Also, a random number generator can be achieved by the code generating apparatus of present disclosure.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
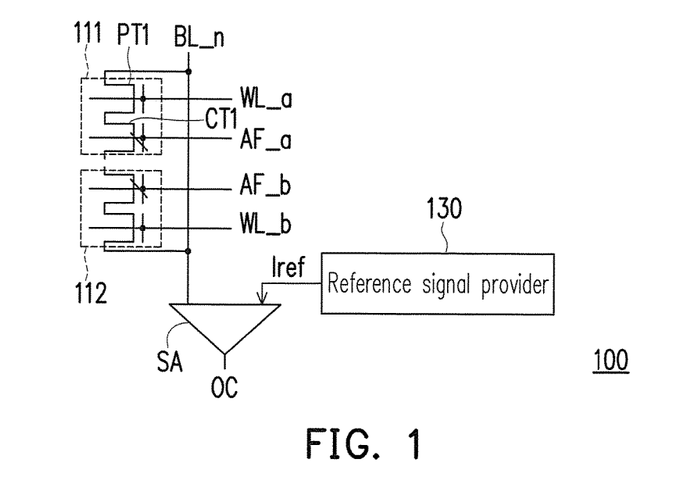
FIG. 1 illustrates a schematic diagram of a code generating apparatus according to an embodiment of present disclosure.

FIG. 1 illustrates a schematic diagram of a code generating apparatus according to an embodiment of present disclosure. The code generating apparatus 100 includes a plurality of one time programming (OTP) memory cells 111-112, a reference signal provider 130, and a sense amplifier SA. The OTP memory cells 111-112 coupled in series, and all of the OTP memory cells 111-112 are coupled to a bit line BL_n. The sense amplifier SA has two input ends, and one of the input ends of the sense amplifier SA is coupled to the bit line BL_n, and another input end of the sense amplifier SA is coupled to the reference signal provider 130. The reference signal provider 130 provides a reference signal Iref to the sense amplifier SA, and in this embodiment, the reference signal Iref may be a reference current. The sense amplifier SA may sense a difference between a signal on the bit line BL_n and the reference signal Iref to generate an output code OC.

On the other hand, in this embodiment, the OTP memory cells 111-112 respectively receive programming signals AF_a and AF_b for programming operation, and respectively receive word line signals WL_a and WL_b for reading operation.

In detail of operation of the code generating apparatus 100, the OTP memory cells 111-112 are programmed according to the programming signals AF_a and AF_b, firstly. The programming signals AF_a and AF_b are predetermined program bias voltages. Then, when the code generating apparatus 100 is used to generate the output code OC, the OTP memory cell 111 can provide a current to the bit line BL_n according to the word line signal WL_a during a first time period, and the sense amplifier SA may generate the output code OC by sensing the difference between the current on the bit line BL_n and the reference signal Iref during the first time period. During a second time period, the OTP memory cell 112 can provide another current to the bit line BL_n according to the word line signal WL_b during a second time period, and the sense amplifier SA may generate the output code OC by sensing the difference between the another current on the bit line BL_n and the reference signal Iref during the second time period, wherein, the OTP memory cell 111 may stop to provide the current to the bit line BL_n during the second time period.

It can be easily seen, by turning on each of the OTP memory cells 111-112 in series, the output code OC having a plurality bits arranged in series can be generated. Of course, a number of the OTP memory cells coupled to the bit line BL_n is not limited to 2, and may equal to N, and N may be any integer larger than 1.

Figure 5:
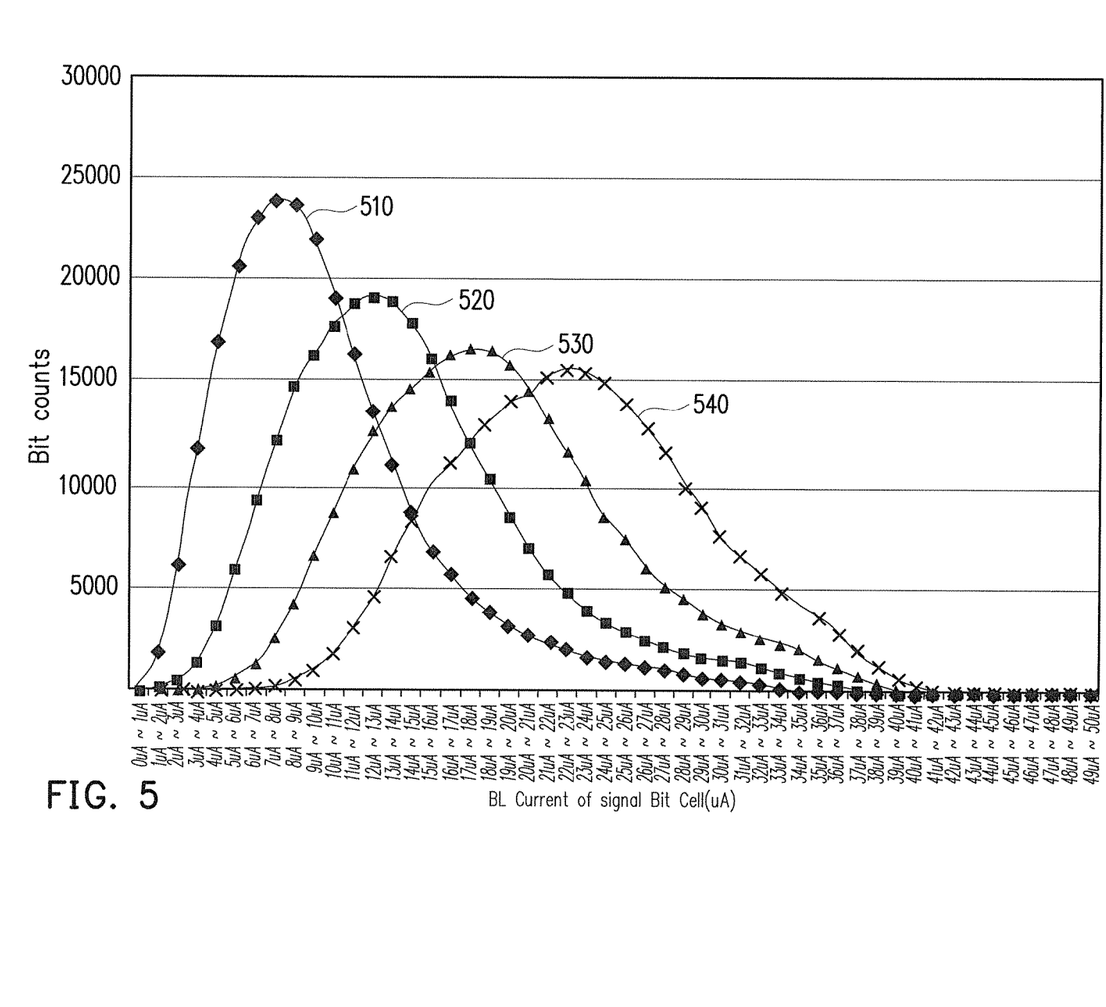
FIG. 5 illustrate a relationship plot of the programming voltages, number of bit count, and the read current provided by OTP memory cells.

It should be noted here, current values of the currents respectively provided by the OTP memory cells 111 and 112 can be determined by the process fluctuations of each of the OTP memory cells 111 and 112. Such as a gate oxide thickness, a poly size, a junction profile, contact resistances on the bit line BL_n, metal CD (critical distance) of the bit line BL_n, etc. Furthermore, current values of the currents respectively provided by the OTP memory cells 111 and 112 can also be determined by programming environments and data reading environments, such as voltage value of the programming signal AF_a and AF_b, and the voltage values of word line signals WL_a and WL_b received by the OTP memory cells 111 and 112. Referring to FIG. 5, FIG. 5 illustrate a relationship plot of the programming voltages, number of bit count, and the read current provided by OTP memory cells. The curves 510-540 are relation curves of number of bit count and corresponding read current provided by OTP memory cells which are programmed by different voltage values of programming signals. It can be seen that a narrow or wide read current spread can be selected by setting different voltage value of programming signals. For example, if the code generating apparatus 100 is used to generate an intrinsic identification code, the curve 540 may be selected, and the voltage value of the programming signal can be set according to curve 540. On the contrary, if the code generating apparatus 100 is used to generate a random number code, the cure 510 may be selected, and the voltage value of the programming signal can be set according to curve 510.

In this embodiment, the OTP memory cell 111 includes a pass transistor PT1 and a transistor capacitor CT1. A first end of the pass transistor PT1 is coupled to the bit line BL_n, a control end of the pass transistor PT1 receives the word line signal WL_a, and a second end of the pass transistor PT1 is coupled to a first end of the transistor capacitor CT1. Further, a control end of the transistor capacitor CT1 receives a programming signal, and a second end of the transistor capacitor CT1 may be floated.

Figure 3:
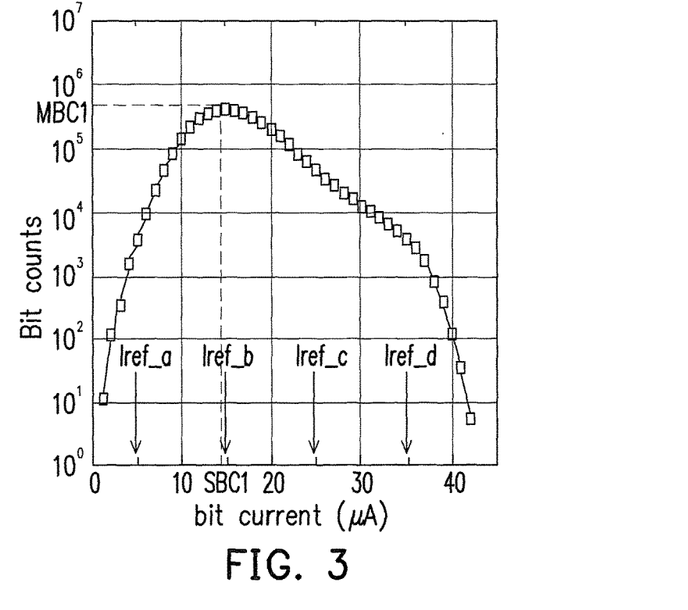
FIG. 3 illustrates a scheme for setting the reference signal Iref according to the embodiment of present disclosure.

On the other hand, the output code OC may be adjusted by adjusting the reference signal Iref provided by the reference signal provider 130. Referring to FIG. 3, FIG. 3 illustrates a scheme for setting the reference signal Iref according to the embodiment of present disclosure. In FIG. 3, the vertical axis indicates a number of bit counts of the OTP memory cells in a code generating apparatus, and the horizontal axis indicates current values provided by corresponding OTP memory cells. In this embodiment, a relationship between a plurality of bit currents and a plurality of bit counts of the OTP memory cells 111-112 can be obtained as shown in FIG. 3. The reference current Iref may be set according to the relationship in FIG. 3. Further, the reference signal provider 130 may select one of the reference currents Iref_a, Iref_b, Iref_c, and Iref_d to adjust the reference current Iref, and the output code OC may be adjusted correspondingly. Also, the reference signal provider 130 may set the reference signal Iref to equal to the reference currents Iref_a, Iref_b, Iref_c, and Iref_d in sequential, and the output code OC with a plurality of bits arranged in series may be generated.

It should be noted, the current value of the reference signal Iref may be set within a range, and the range may be determined by a bit current SBC1 corresponding to a maximum bit count MBC1. The range may be set to include the bit current SBC1 corresponding to the maximum bit count MBC1, and a width of the range may be set by a pre-set value.

Figure 4:
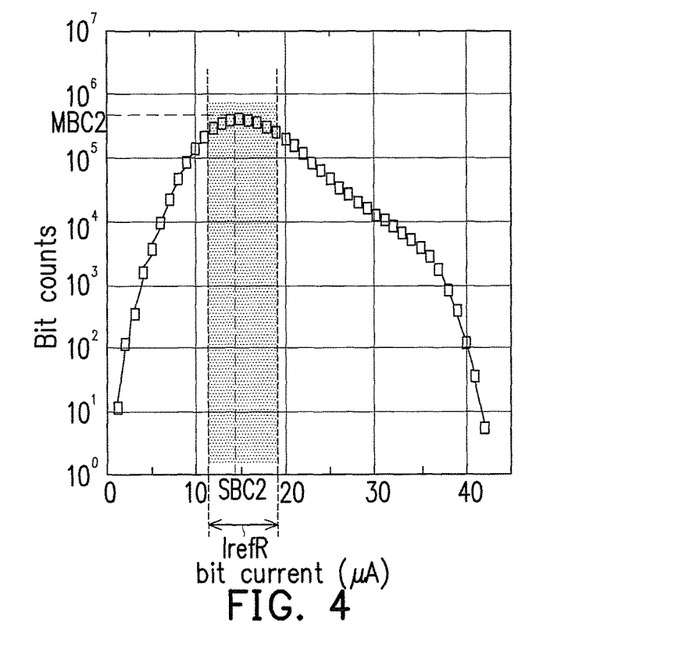
FIG. 4 illustrate another scheme for setting the reference signal Iref according to the embodiment of present disclosure.

In another embodiment of present disclosure, the code generating apparatus 100 may also be used to provide random number code. Referring to FIG. 1 and FIG. 4, wherein FIG. 4 illustrate another scheme for setting the reference signal Iref according to the embodiment of present disclosure. In FIG. 4, the vertical axis indicates a number of bit counts of the OTP memory cells in a code generating apparatus, and the horizontal axis indicates current values of bit currents provided by corresponding OTP memory cells. The reference signal provider 130 may setting the current value of the reference signal Iref within a range IrefR, wherein the range IrefR is set according to a bit current SBC2 corresponds to a maximum bit count MBC2 in FIG. 4, and the bit current SBC2 may be in a central of the range IrefR. By setting the current value of the reference signal Iref within the range IrefR, the code generating apparatus 100 may provide the output code DC instable by reading the OTP memory cells 111-112 repeatedly, and a random number code can be obtained. The range IrefR in FIG. 4 is smaller than the range in FIG. 3, and in FIG. 4, the range IrefR is smaller than 10 μA.

By setting the range IrefR with a narrow width, a comparison result of the sense amplifier SA is sensitive to electronic characteristic of each of the OTP memory cells 111-112, and whether a bit current provided by each of the OTP memory cells 111-112 is larger than the reference signal Iref or not may be determined by a manufacturing variation (such as a process variation) of each of the OTP memory cells 111-112. It can be seen, at least one manufacturing variation of the OTP memory cells 111-112 can be enlarged when the OTP memory cells 111-112 are programmed by a predetermined program bias voltage, and the output code may be a security code accordingly. Furthermore, the programming operation of the OTP memory cells 111-112 cannot be operated by user, and the electronic characteristic of the programmed OTP memory cells 111-112 may not be changed.

That is, the output code OC can be determined by process parameters of the OTP memory cells 111-112, and the output code OC may be used to be an identity codes and/or the security code which cannot be modified by users. Such as that, the output code OC of present disclosure may be used for a physically unclonable function technology.

Figure 2:
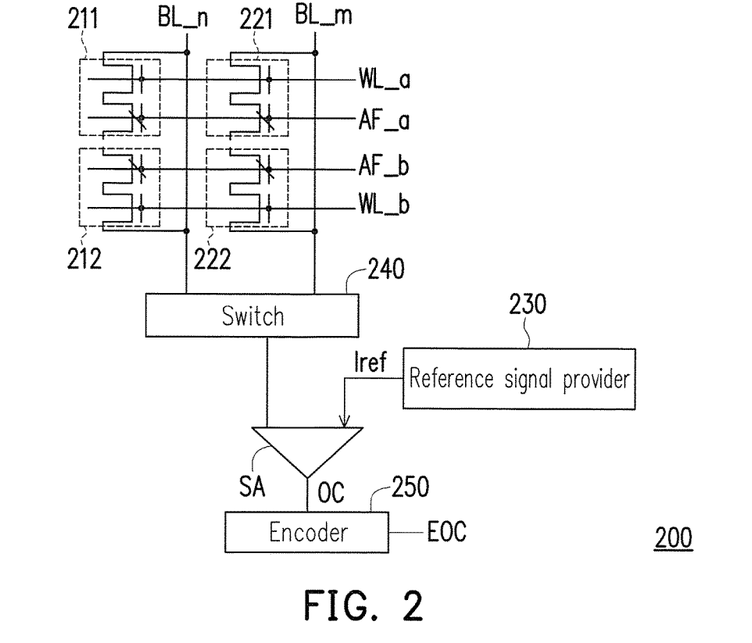
FIG. 2 illustrates a schematic diagram of a code generating apparatus according to another embodiment of present disclosure.

Referring to FIG. 2, FIG. 2 illustrates a schematic diagram of a code generating apparatus according to another embodiment of present disclosure. The code generating apparatus 200 includes a plurality of OTP memory cells 211-212 and 221-222, a switch 240, a reference signal provider 230 and a sense amplifier SA. The OTP memory cells 211-212 are coupled in series and coupled to the bit line BL_n. The OTP memory cells 221-222 are coupled in series and coupled to another bit line BL_m. Different from the code generating apparatus 100 of FIG. 1, the switch 240 has two input ends which are respectively coupled to the bit lines BL_n and BL_m. The switch 240 also has an output end which is coupled to the sense amplifier SA. The switch 240 is used to select the bit line BL_n or the bit line BL_m to couple to the sense amplifier SA. When the bit line BL_n is coupled to the sense amplifier SA, one of the OTP memory cells 211-212 may provide a current to the sense amplifier SA, and the sense amplifier SA may generate the output code OC by sensing the difference between the current from the bit line BL_n and the reference signal Iref. Furthermore, when the bit line BL_m is coupled to the sense amplifier SA, one of the OTP memory cells 221-222 may provide another current to the sense amplifier SA, and the sense amplifier SA may generate the output code OC by sensing the difference between the current from the bit line BL_m and the reference signal Iref.

In this embodiment, the code generating apparatus 200 further includes an encoder 250. The encoder 250 is coupled to an output end of the sense amplifier SA to receive the output code OC. The encoder 250 may encode the output code OC to generate an encoded output code EOC. Please be noted here, the encoder 250 may operates any encoding operation which is well-known by a person skilled in the art on the output code OC to generate the encoded output code EOC. For example, the encoder 250 may operates a parity check on the output code which has a plurality of bits to generate the encoded output code EOC, or, the encoder 250 may count a number of "1" (or "0") on the output code which has a plurality of bits to generate the encoded output code EOC.

To ensure the consistency of the output code OC for hardware intrinsic ID creation, one or more ECC bit(s) can be created along with the output code OC in the beginning by the encoder 250. The ECC bit(s) may be stored in an OTP block. The OTP block mentioned above may be same with the OTP block with the OTP memory cells 211-212 and 221-222, or the OTP block mentioned above may be different from the OTP block with the OTP memory cells 211-212 and 221-222. In additional, to ensure the reliability of the generated output code OC for hardware intrinsic ID creation, some security flags also may be used to protect the OTP memory cells 211-212 and 221-222 from any re-write operation once. The flags may be stored in an OTP block which is same as the OTP block with the OTP memory cells 211-212 and 221-222, or the flags may be stored in another OTP block different from the OTP block with the OTP memory cells 211-212 and 221-222.

In some embodiment, the flags may also be used to protect the OTP block from any read operation. That is, the output code OC can be prevented from read without authorization by using the flags.

The encoder 250 may be a logic circuit which is implemented by one or more logical gates, or the encoder 250 also may be implemented by a processor which can execute one or more encoding algorithm(s).

Figure 6:
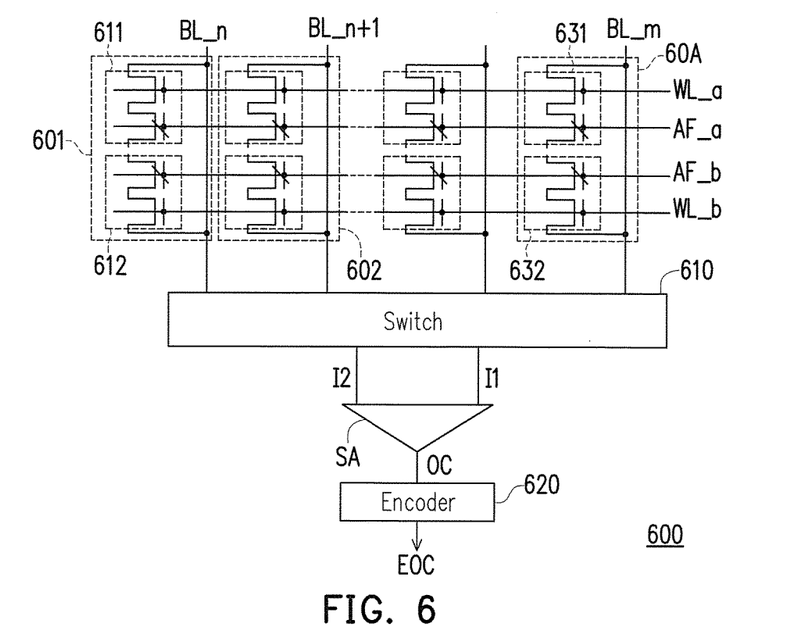
FIG. 6 illustrates a schematic diagram of a code generating apparatus according to another embodiment of present disclosure.

Referring to FIG. 6, FIG. 6 illustrates a schematic diagram of a code generating apparatus according to another embodiment of present disclosure. The code generating apparatus 600 includes a plurality of OTP memory cell strings 601-60A, a switch 610, a sense amplifier SA, and an encoder 620. Each of the OTP memory cell strings 601-60A includes a plurality of OTP memory cells. For example, the OTP memory cell string 601 includes the OTP memory cells 611-612, the OTP memory cell string 60A includes the OTP memory cells 631-632. Furthermore, the OTP memory cell strings 601-60A are respectively coupled to a plurality of bit lines. For example, the OTP memory cell strings 601 and 602 are respectively coupled to the bit lines BL_n and BL_n+1, the OTP memory cell string 60A is coupled to the bit lines BL_m. The switch 610 is coupled to the bit lines BL_n, BL_n+1 . . . BL_m, and the switch 610 is also coupled to the sense amplifier SA. The switch 610 selects one of the bit lines BL_n, BL_n+1 . . . BL_m to couple to the first input end I1 of the sense amplifier SA, and selects another one of the bit lines BL_n, BL_n+1 . . . BL_m to couple to the second input end I2 of the sense amplifier SA.

The sense amplifier SA senses a difference of signals on the two selected bit lines to generate an output code OC. In an embodiment of present disclosure, the sense amplifier SA may compare currents on the two selected bit lines to generate the output code OC.

The encoder 620 is coupled to the output end of the sense amplifier SA. The encoder 620 receives the output code OC and encodes the output code to generate an encoded output code EOC.

It should be noted here, the OTP cells 611, 612, 631 and 632 of the code generating apparatus 600 are programmed. In this embodiment, the OTP memory cells 611 and 631 may form an OTP memory cell pair, and the OTP memory cells 612 and 632 form another OTP memory cell pair. The OTP memory cells in each of the OTP pairs may be programmed simultaneously, and the OTP memory cells in each of the OTP pairs may also be read simultaneously. In FIG. 6, the OTP memory cells 611 and 631 receive the same word line signal WL_a and the same programming signal AF_a, and the OTP memory cells 612 and 632 receive the same word line signal WL_b and the same programming signal AF_b.

If the bit lines BL_n and BL_m are two selected bit lines, read currents provided to the bit lines BL_n and BL_m may be respectively determined by the manufacturing variation (such as an intrinsic process variation) and programming environment of the OTP memory cells 611 and 631, or the OTP memory cells 612 and 632, and the output code OC can be obtained according to the intrinsic process variation and programming environment of the OTP memory cells 611 and 631, or the OTP memory cells 612 and 632.

Figure 7A:
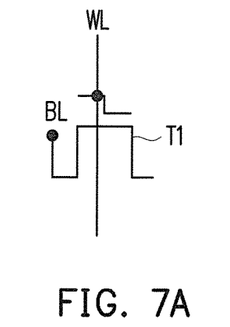
FIG. 7A-FIG. 7C respectively illustrate circuit view, top view and cross view of an OTP memory cell according to an embodiment of present disclosure.
Figures 7B, 7C:
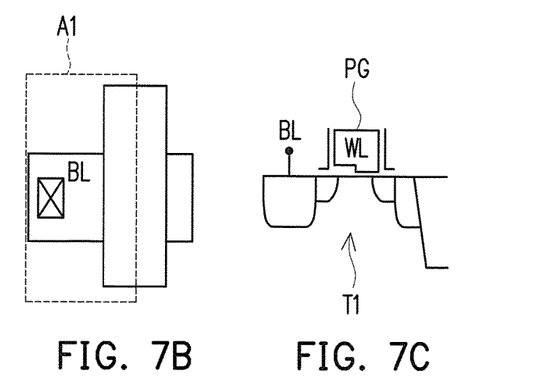

Referring to FIG. 7A-FIG. 7C, FIG. 7A-FIG. 7C respectively illustrate circuit view, top view and cross view of an OTP memory cell according to an embodiment of present disclosure. In FIG. 7A, the OTP memory cell can also be implemented by a transistor T1 having dual gate oxide thickness. The transistor T1 has a first end coupled to a bit line BL, a control end receiving a word line signal WL, and a second end which is floated. The gate oxide of the transistor T1 has dual thickness, and a side near the bit line signal BL of the gate oxide is thicker than another side of the gate oxide.

In FIG. 7B, a thickness of the oxide in the area A1 is thicker than a thickness of the oxide outside from the area A1. In FIG. 7C, a poly gate PG with dual thickness covers on the channel of the transistor T1, and the poly gate PG receives the word line signal WL. One of the N+ diffusion areas of the transistor T1 is coupled to the bit line BL.

It should be noted here, there are many other structures may also be used to implement the OTP memory cell of presented disclosure. Such as, an anti-fuse cell with one pass transistor and two MOS capacitors; an anti-fuse cell with two pass transistors on single side and one MOS capacitor; an anti-fuse cell with one pass transistor on each side and one MOS capacitor lying between; an anti-fuse cell with one pass transistor, one MOS capacitor, and one isolation transistor; and, an OTP memory cell with one pass transistor and one floating-gate transistor for charge storage.

Figure 8A:
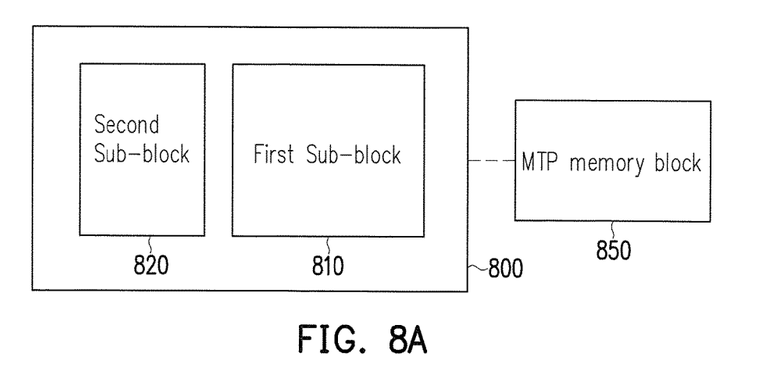
FIG. 8A illustrates a block diagram of one time programming (OTP) memory block according to an embodiment of present disclosure.

Referring to FIG. 8A, FIG. 8A illustrates a block diagram of one time programming (OTP) memory block according to an embodiment of present disclosure. The OTP memory block 800 has a plurality of code generating apparatuses, and each of the code generating apparatuses can be implemented by the code generating apparatuses 100, 200 or 600. In FIG. 8A, the OTP memory block 800 has a first sub-block 810 and a second sub-block 820. The first sub-block 810 may include a first part of the code generating apparatuses, and the first part of the code generating apparatuses are used to provide at least one identity code. The second sub-block 820 may include a second part of the code generating apparatuses. The second part of the code generating apparatuses are used to provide at least one random number code, or, in some embodiments, the second sub-block 820 may be used for normal data storage.

In some embodiment, the OTP memory block 800 may be coupled to at least one multiple time program (MTP) memory block 850, wherein the MTP memory block 850 is used for normal data storage.

Figure 8B:
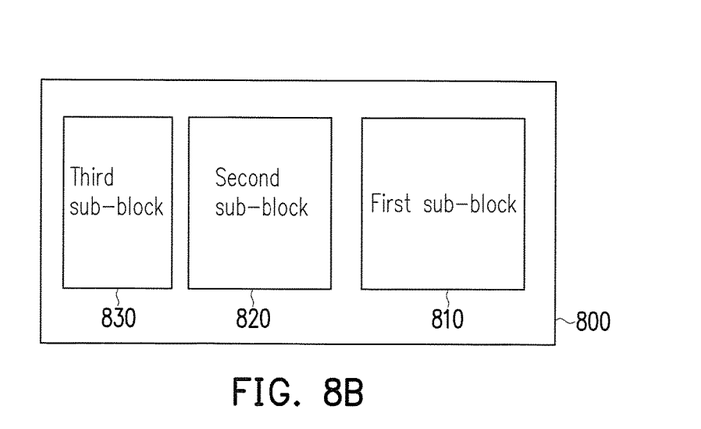
FIG. 8B illustrates a block diagram of one time programming (OTP) memory block according to another embodiment of present disclosure.

Referring to FIG. 8B, FIG. 8B illustrates a block diagram of one time programming (OTP) memory block according to another embodiment of present disclosure. In FIG. 8B, the OTP memory block 800 has the first sub-block 810 and the second sub-block 820, and further has a third sub-block 830. The first sub-block 810 may include the first part of the code generating apparatuses, and the first part of the code generating apparatuses are used to provide at least one identity code. The second sub-block 820 may include the second part of the code generating apparatuses. The second part of the code generating apparatuses are used to provide at least one random number code. The second sub-block 830 may include a third part of the code generating apparatuses, and the third sub-block 830 may be used for normal data storage.

It should be noted here, when the sub-blocks are used to provide identity codes respectively, the output codes are different between blocks and each of the output codes is treated as hardware intrinsic identity to each of the sub-blocks.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for generating an output code for a physically unclonable function technology, comprising:
   selecting at least one of a plurality of one time programming (OTP) memory cells and providing a read current from a predetermined bias voltage according to the selected OTP memory cell, wherein the read current is set to enlarge at least one manufacturing variation of the memory cells;
   determining a relationship between a plurality of bit currents and a plurality of bit counts of the OTP memory cells;
   setting a range by the bit current corresponding to a maximum bit count, wherein the bit current is from the plurality of bit currents and the maximum bit count is determined from the plurality of bit counts;
   setting a reference signal at a predetermined current value which is in the range; and
   comparing the read current and the reference signal to generate an output code for a physically unclonable function technology, wherein the output code is determined by a manufacturing variation of the selected OTP memory cell.

2. A method for generating security information, comprising:
   providing a plurality of memory cells;
   programming the memory cells with a predetermined program bias voltage wherein the programming bias voltage is set to enlarge at least one manufacturing variation of the memory cells;
   and generating a security code for a physically unclonable function according to at least one of the memory cells, wherein the step of generating the security code comprises the following:

determining a relationship between a plurality of bit currents and a plurality of bit counts of the memory cells;

setting a range by the bit current corresponding to a maximum bit count, wherein the bit current is from the plurality of bit currents and the maximum bit count is determined from the plurality of bit counts;

setting a reference signal at a predetermined current value which is in the range; and selecting one memory cell among the memory cells; and comparing a read current of the selected memory cell and the reference signal to generate the security code, wherein the security code is determined according to a manufacturing variation of the selected memory cell.

* * * * *